United States Patent [19]

Turczyk

[11] 4,168,285

[45] Sep. 18, 1979

[54] BLEND OF A VINYL CHLORIDE POLYMER AND AN IMPACT MODIFIER

[75] Inventor: Michael J. Turczyk, Yonkers, N.Y.

[73] Assignee: Stauffer Chemical Company, Westport, Conn.

[21] Appl. No.: 908,190

[22] Filed: May 22, 1978

Related U.S. Application Data

[63] Continuation-in-part of Ser. No. 840,681, Oct. 11, 1977, abandoned.

[51] Int. Cl.$^2$ .................... C08L 51/00; C08L 35/06
[52] U.S. Cl. .................. 525/82; 260/28.50; 260/45.75 J; 525/85; 525/233
[58] Field of Search ................. 260/876 R

[56] References Cited

U.S. PATENT DOCUMENTS

| 3,655,826 | 4/1972 | Fellmann et al. ............... 260/876 R |
| 3,944,631 | 3/1976 | Yu et al. ....................... 260/881 |

Primary Examiner—Carman J. Seccuro
Attorney, Agent, or Firm—Richard P. Fennelly

[57] ABSTRACT

A blend of a vinyl chloride polymer, and a crosslinked (meth)acrylate/crosslinked styrene-acrylonitrile/uncrosslinked styrene-acrylonitrile impact modifier is disclosed. The presence of the impact modifier gives the blend improved impact resistance as compared to the vinyl chloride polymer alone. The impact modifier also functions as a heat distortion temperature improver and process aid for the vinyl chloride polymer.

10 Claims, No Drawings

BLEND OF A VINYL CHLORIDE POLYMER AND AN IMPACT MODIFIER

This application is a continuation-in-part application of U.S. Ser. No. 840,681, filed Oct. 11, 1977 now abandoned.

BACKGROUND OF THE INVENTION

1. Field of the Invention

The present invention relates to a blend of a vinyl chloride polymer and an impact modifier which gives an improved impact resistance as compared to the vinyl chloride polymer alone. The impact modifier also functions as a heat distortion temperature improver and process aid for the vinyl chloride polymer.

2. Description of the Prior Art

The use of three-stage acrylic elastomer impact modifiers in blends containing a vinyl chloride polyer is known and is described in U.S. Pat. No. 3,655,826 to R. P. Fellmann et al. In this prior art patent a crosslinked (meth)acrylate/crosslinked styrene/uncrosslinked methacrylate or acrylate composition is described, and this additive is said to function as an impact modifier when admixed with the vinyl chloride polymer (Col. 5, lines 49–52 and 65–70).

SUMMARY OF THE PRESENT INVENTION

The present invention is a blend of (1) a vinyl chloride polymer and (2) an effective amount of a crosslinked (meth)acrylate/crosslinked styrene-acrylonitrile/uncrosslinked styrene-acrylonitrile impact modifier to give an improved impact resistance for the blend as compared to the corresponding properties for the vinyl chloride polymer alone, and to function as a heat distortion temperature improver and a process aid for the vinyl chloride polymer. Unexpectedly, the blend of the present invention exhibits improved tensile and Izod impact values as compared to the type of blend described in U.S. Pat. No. 3,655,826 to R. P. Fellmann et al. if the third stage is an uncrosslinked styrene-acrylonitrile composition and the second stage consists of crosslinked styrene-acrylonitrile.

DESCRIPTION OF PREFERRED EMBODIMENTS OF THE INVENTION

The blend of the present invention contains a vinyl chloride polymer and a crosslinked (meth)acrylate/crosslinked styrene-acrylonitrile/uncrosslinked styrene-acrylonitrile impact modifier composition.

The term "vinyl chloride polymer", for purposes of the present invention, is defined as including both homo- and copolymers of vinyl chloride. The term also is used to refer to chlorinated vinyl chloride polymers which generally have a chlorine content of from about 56% to about 70%, by weight. The preferred polymer is a homopolymer of vinyl chloride but the vinyl chloride polymer can also contain up to about 50%, by weight, of other ethylenically unsaturated compounds which are copolymerizable with vinyl chloride monomer. Representative ethylenically unsaturated comonomers include: the vinyl alkanoates, such as vinyl acetate, vinyl propionate, and the like; the vinylidene halides, such as vinylidene bromide, vinylidene chloride, vinylidene fluorochloride, and the like; unsaturated hydrocarbons, such as ethylene, propylene, and isobutylene; halogenated hydrocarbons, such as chlorinated ethylene, and the like; the allyl compounds, such as allyl acetate, allyl chloride, allyl ethyl ether, and the like.

The terminology "crosslinked (meth)acrylate/crosslinked styrene-acrylonitrile/uncrosslinked styrene-acrylonitrile polymer composition" is to be understood as referring to the type of polymer composition described in U.S. Pat. No. 3,944,631 to A. J. Yu et al. Such a composition can be formed by the following three-step sequential polymerization reaction:

1. emulsion polymerizing a monomer charge (herein designated "(meth)acrylate", for purposes of the present invention), of at least one $C_2$–$C_{10}$ alkyl acrylate, $C_8$–$C_{22}$ alkyl methacrylate, or compatible mixtures, in an aqueous polymerization medium in the presence of an effective amount of a suitable di- or polyethylenically unsaturated crosslinking agent for such a monomer, with the $C_4$–$C_8$ alkyl acrylates being the preferred (meth)acrylate monomers for use in this step;

2. emulsion polymerizing a monomer charge of styrene and acrylonitrile in an aqueous polymerization medium, also in the presence of an effective amount of a suitable di- or polyethylenically unsaturated crosslinking agent for such a monomer, said polymerization being carried out in the presence of the product from Step 1 so that the crosslinked (meth)acrylate and crosslinked styrene-acrylonitrile components form an interpolymer wherein the respective phases surround and penetrate one another; and 3. either emulsion or suspension polymerizing a monomer charge of styrene and acrylonitrile, in the absence of a crosslinking agent, in the presence of the product resulting from Step 2. If desired, Steps 1 and 2 can be reversed in the above described procedure.

This product, which is used as the additive in the blend of the present invention, comprises from about 5% to about 50%, by weight, of at least one of the above-identified crosslinked (meth)acrylates, from about 5% to about 35%, by weight, of the crosslinked styrene-acrylonitrile component and from about 15% to about 90%, by weight, of the uncrosslinked styrene-acrylonitrile component. It contains little graft polymerization between the styrene-acrylonitrile copolymer segments and the crosslinked (meth)acrylate component, and it has a processing range of from about 199° C. to about 232.2° C. due to the presence of potentially varying amounts of three differing polymer phases in the composition. Further details regarding this type of polymer composition can be found in U.S. Pat. No. 3,944,631 to A. J. Yu et al., which is incorporated herein by reference.

The blend of the present invention contains: (1) a vinyl chloride polymer (optionally, in combination with one or more additives selected from the conventional and compatible process aids, lubricants, stabilizers, fillers, other impact modifiers, flame retardants, colorants, and the like) and (2) an effective amount of the above-described impact modifier for improved impact resistance and an improved heat distortion temperature. Generally, the amount of the impact modifier of the present invention that will be used will range from about 5% to about 95%, by weight of the total blend, preferably from about 25% to about 75%, by weight of said blend. The impact modifier should be added in particulate form having an average particle size ranging from about 10 to about 100 microns in order to insure a substantially uniform distribution of modifier in the blend. In order to give a commercially desirable degree of impact resistance, the average particle size of the (meth)acrylate portion of the modifier should also be from about 0.3 micron to about 1 micron, with the greatest degree of impact resistance improvement being realized near the upper portion of such range. It is well within the ability of a person or ordinary skill in the art to select appropriate reaction conditions to give (meth)acrylate particles having this average particle size range. Such factors as the type of emulsifier, the concentration of emulsifier, the pH of the reaction medium and the initiator concentration all have an effect on particle size. Generally speaking, the use of less initiator, a lower concentration of emulsifier, use of an emulsifier which is less efficient in emulsifying the monomers, and a pH in the range of from about 5 to 7 will tend to produce larger particle sizes.

The invention is further illustrated with the Examples which follow:

(COMPARATIVE) EXAMPLE 1

This Example illustrates the unexpectedly greater Izod and tensile impact values that were obtained for the polyblend of the present invention as compared to the type of polyblend described in U.S. Pat. No. 3,655,826 to R. P. Fellmann et al.

Preparation of the Respective Impact Modifier Additives

Step 1

Both additives were prepared by first forming a crosslinked polybutyl acrylate component by bottle polymerizing the following reaction mixture (in each of six bottles) for 4.5 hours at 65° C.:

| Ingredient | Amount |
| --- | --- |
| Water | 115 gm. |
| Sodium bis(tridecyl) sulfosuccinate emulsifier - (1 wt. % solution) | 150 gm. |
| Butyl acrylate | 150 gm. |
| Butylene glycol diacrylate crosslinker | 0.6 ml. |
| Sodium bicarbonate buffer - (1 wt. % solution) | 35 gm. |
| Ammonium persulfate initiator - (1 wt. % solution) | 60 gm. |

Step 2

In this step, the latex from Step 1 was polymerized in the reaction media given below in the presence of reactants for either a crosslinked polystyrene second stage component, according to U.S. Pat. No. 3,655,826 (Bottle Nos. 1 and 2), or reactants for a crosslinked styrene-acrylonitrile second stage, in accordance with the present invention (Bottle Nos. 3 and 4). The reaction was conducted for 2.5 hours at 70° C.:

| Bottle Nos. | Ingredient | Amount |
| --- | --- | --- |
| 1-4 | Water | 112 gm. |
| 1-4 | Latex from Step 1 | 278 gm. |
| 1-2 | Styrene | 30 gm. |
| 3-4 | Styrene | 22 gm. |
| 3-4 | Acrylonitrile | 8 gm. |
| 1-4 | benzene benezene crosslinker | 0.3 |
| 1-4 | Ammonium persulfate - (1 wt. % soln.) | 20 gm. |
| 1-4 | Sodium Bicarbonate - (1 wt. soln.) | 10 gm. |

Step 3

In this step, the respective latexes from Step 2 were polymerized in the reaction media given below to form either the prior art additive described in U.S. Pat. No. 3,655,826 (Bottle Nos. 1-3) or the additive used in accordance with the present invention (Bottle Nos. 4-6). The polymerization was run for 3.25 hrs. at 70° C.:

| Bottle Nos. | Ingredient | Amount |
| --- | --- | --- |
| 1-6 | Water | 60 gm. |
| 1-6 | Sodium bis(tridecyl) sulfosuccinate (1 wt. % solution) | 21 gm. |
| 1-6 | Ammonium persulfate (1 wt. % solution) | 50 gm. |
| 1-3 | Latex from Bottle Nos. 1 and 2 (Step 2) | 207 gm. |
| 4-6 | Latex from Bottle Nos. 3 and 4 (Step 2) | 207 gm. |
| 1-6 | Sodium bicarbonate (1 wt. % solution) | 25 gm. |
| 1-6 | Styrene | 61.6 gm. |
| 1-6 | Acrylonitrile | 22.8 gm. |
| 1-6 | t-dodecyl mercaptan | 0.24 ml. |

The calculated composition of the prior art additive in Bottle Nos. 1-3 (% by weight) was:
Crosslinked polybutyl acrylate—27.5%
Crosslinked styrene—10%
Uncrosslinked styrene-acrylonitrile—62.5%

The calculated composition of the additive of this invention in Bottle Nos. 4-6 (% by weight) was:
Crosslinked polybutyl acrylate—27.5%
Crosslinked styrene-acrylonitrile—10%
Uncrosslinked styrene-acrylonitrile—62.5%

Testing of Blends Containing the Respective Additives

The additives from Bottles 1-3 and 4-6, respectively, were each then placed in a polyvinyl chloride composition, and the physical properties of the resulting blend were measured. The blend was formed by mixing the ingredients listed below and placing them in a two roll mill having its front roll at a temperature of 179° C. and its rear roll at a temperature of 182° C. to form a sheet having a thickness of about 3 mm. All amounts given below are in grams:

| | Batch | |
| --- | --- | --- |
| Ingredient | A | B |
| Vinyl chloride homopolymer | 180 | 180 |
| Acrylic process aid | 5.4 | 5.4 |
| Tin mercaptan stabilizer ("Thermolite 31" from M and T Chemical) | 5.4 | 5.4 |
| Carnauba Wax ("Wax E", Hoechst Chemical) | 1.8 | 1.8 |
| Product from Bottles 1-3 | — | 120 |
| Product from Bottles 4-6* | 120 | — |

*additive used in accordance with the present invention.

The physical properties of each of the above batches was then determined using standard ASTM test procedures. Batch A is the composition of the present invention, whereas Batch B is the blend of Fellmann et al. U.S. Pat. No. 3,655,826.

| | Batch | |
| --- | --- | --- |
| | A | B |
| Tensile Strength (ASTM D-882) | | |
| at yield: (kg/cm$^2$) | 485.12 | 421.84 |
| at break: (kg/cm$^2$) | 316.38 | 330.44 |
| Elongation (%) (ASTM D-882) | | |

-continued

|  | Batch | |
|---|---|---|
|  | A | B |
| at yield | 3.0 | 2.4 |
| at break | 12.0 | 19.0 |
| Elastic Modulus (ASTM D-882) (kg/cm$^2$ × 10$^4$) | 2.88 | 2.81 |
| Tensile Impact (ASTM D-1822-61T) (cm-kg/cm$^2$) | 205 | 141 |
| Izod Impact (ASTM-256-56[61]) (cm-kg/cm-notch) | 54.4 | 16.3 |
| Flexural Tangent Modulus (ASTM D-790-1966) (kg/cm$^2$ × 10$^4$) | 2.53 | 2.32 |

The blend of the present invention (Batch A) has significantly higher tensile and Izod impact values than the prior art blend (Batch B), thereby indicating greater impact resistance for the blend.

EXAMPLE 2

A series of blends of polyvinyl chloride (PVC) and the additive desired for use in the present invention were formed and were evaluated for Izod impact, Gardner dart drop and heat distortion temperature. The process used for forming the test samples was as follows:

1. A PVC master batch was prepared in a Henschel mixer by mixing together the following ingredients at 3800 rpm.:

| Ingredient | Amount (parts by weight) |
|---|---|
| PVC | 100 |
| Tin stabilizer | 3 |
| Acrylic process aid | 1 |
| Polyethylene lubricant | 1 |

The stabilizer was added to the PVC when at a temperature of 60° C., the process aid when the temperature was 71.1° C., the lubricant at a temperature of 93.3° C., and the entire batch was then heated to 110° C. until homogeneous and was cooled to room temperature;

2. The PVC master batch from Step 1 was mixed with varying amounts of the type of additive used in Comparative Example 1 having an average particle size for the (meth)acrylate component of from about 0.65±0.15 micron. The mixing was carried out in a Henschel mixer at 3800 rpm. and a temperature of about 48.9° C.; and 3. The various mixtures of PVC and additive were injected molded (Feed: 176.7° C.; transition section: 193.3° C.; nozzle: 198.9° C.; Mold, ASTM type: 51.7° C.)

The Tables which follow show the results that were obtained for formulations containing two different types of PVC resin.

TABLE 1

| PVC Formulation[1] (wt. %) | Additive (wt. %) | Izod Impact[2] (cm.-kg./cm. notch) | Dart Drop[3] (cm.-kg./mm.) | DTL (° C.) |
|---|---|---|---|---|
| 100 (Control) | 0 | 8.6/9.24 | 95.34 | 74.4 |
| 80 | 20 | 77.8/58.2 | 127.12 | 77.2 |
| 60 | 40 | 139.8/124.6 | 127.12 | 80 |
| 40 | 60 | 111/124.6 | 118.04 | 82.2 |
| 20 | 80 | 13.6/54.9 | 99.88 | 85.6 |
| 0 | 100 | 15.23/15.23 | 86.26 | 85.0 |

[1] a low molecular weight homopolymer of vinyl chloride, available as "SCC-614" from Stauffer Chemical Company, Plastics Division, Westport, Connecticut.
[2] the figures represent the average values from two series of runs (ASTM-256-56[61]).
[3] Gardner dart drop, performed on 6" × 6" (15.2 cm. × 15.2 cm.) compression molded plaques which were 1.5 mm. thick. Using Gardner-SPI Modified Variable Height Impact Tester No. IG-120-MA (Gardner Laboratory, Inc.) a 4 lb. (1.81 kg.) weight was dropped onto thw samples from various heights and the force per mm. in thickness of sample was recorded at the point 50% of the samples failed.

TABLE 2

| PVC Formulation[1] (Wt. %) | Additive (Wt. %) | Izod Impact[2] (cm-kg/cm notch) | Dart Drop[3] (cm.-kg/mm.) | DTL (°C.) |
|---|---|---|---|---|
| 100 (Control) | 0 | 9.8/2.8 | 118.04 | 76.1 |
| 80 | 20 | 86.5/76.7 | 127.12 | 79.4 |
| 60 | 40 | 133.8/134.9 | 122.58 | 83.3 |
| 40 | 60 | 114.2/111.5 | 118.04 | 85 |
| 20 | 80 | 15.8/88.7 | 95.34 | 88.9 |
| 0 | 100 | 15.23/15.23 | 86.26 | 85.0 |

[1] a high molecular weight homopolymer of vinyl chloride, available as "SCC-676" from Stauffer Chemical Company, Plastics Division, Westport, Connecticut.
[2] the figures represent the average values from two series of runs (ASTM-256-56[61]).
[3] Gardner dart drop, performed on 6" × 6" (15.2 cm. × 15.2 cm.) compression molded plaques which were 1.5 mm. thick. Using Gardner-SPI Modified Variable Height Impact Tester No. IG-1120-MA (Gardner Laboratory, Inc.) a 4 lb. (1.81 kg.) weight was dropped onto the samples from various heights, and the force per mm. in thickness of sample was recorded at the point 50% of the samples failed.

EXAMPLE 3

This Example illustrates the present invention for blends which comprise chlorinated polyvinyl chloride.

The following formulations were mixed at a temperature of 182.2°–187.8° C. until homogeneous and were molded into test plaques for testing at 198.9° C. All amounts are given in parts by weight:

| Ingredients | 1 | 2 | 3 |
|---|---|---|---|
| Chlorinated PVC (68% Cl) | 100 | 100 | 100 |
| Tin mercaptan stabilizer | 3 | 3 | 3 |

-continued

| Ingredients | 1 | 2 | 3 |
|---|---|---|---|
| Acrylic process aid | 3 | 3 | 3 |
| Carnauba Wax lubricant | 1 | 1 | 1 |
| Additive of Example 1 | 20 | 40 | — |

The Izod impact values were 37.0 cm-kg/cm-notch for Formulation No. 1, 81.6 cm-kg/cm-notch for Formulation No. 2 and 4.36 cm-kg/cm-notch for Formulation No. 3 (Control).

EXAMPLE 4

This Example illustrates the increased Izod impact when the average particle size of the (meth)acrylate in the additive is in the range of from about 0.6 to about 0.8 micron compared to a smaller particle size of 0.18 to 0.26 micron.

The following homogeneous master batch of PVC was prepared as described in Example 3 from the following ingredients (all amounts given in parts by weight):

| Ingredients | Amount |
|---|---|
| Polyvinyl chloride homopolymer | 100 |
| Tin mercaptan stabilizer | 3 |
| Carnauba Wax | 1 |
| Arcylic Process Aid | 3 |

The master batch was then mixed at from about 182.2° C. to about 187.8° C. with two different additives made in accordance with U.S. Pat. No. 3,944,631 to A. J. Yu, each having differing average particle sizes, until a homogeneous blend resulted. The formuations were:

| Ingredients | 1 | 2 |
|---|---|---|
| PVC Master Batch | 100 | 100 |
| Additive No. 1* | 40 | — |
| Additive No. 2* | — | 40 |

*had an average particle size for the (meth)acrylate component of from about 0.18 to about 0.26 micron.
**had an average particle size for the (meth)acrylate component of from about 0.6 to about 0.8 micron.

Test plaques were made as described in Example 3 and the following Izod impact values were obtained:
Formulation No. 1: 43.5 cm-kg/cm.-notch
Formulation No. 2: 130.6 cm-kg/cm.-notch The foregoing Examples illustrate certain characteristics and preferred embodiments of the present invention and should not be construed in a limiting sense. The scope of protection which is sought is given in the claims which follow.

I claim:

1. A blend of: (1) a vinyl chloride polymer; and (2) as an impact modifier an effective amount of a three-stage interpolymer having as the first stage a crosslinked polymer consisting of acrylate, methacrylate, or compatible mixture thereof, crosslinked styrene-acrylonitrile as the second stage, uncrosslinked styrene-acrylonitrile as the third stage to give an improved impact resistance for the blend as compared to the vinyl chloride polymer alone and to function as a process aid and heat distortion temperature improver for the vinyl chloride polymer.

2. A blend as claimed in claim 1 wherein the impact modifier comprises from about 5% to 50%, by weight, of crosslinked acrylate, methacrylate, or compatible mixture thereof, from about 5% to about 35%, by weight, of crosslinked styrene-acrylonitrile, and from about 15% to about 90%, by weight of uncrosslinked styrene-acrylonitrile.

3. A blend as claimed in claim 1 wherein the impact modifier is present at about 5% to about 95%, by weight of the blend.

4. A blend as claimed in claim 1 wherein the impact modifier is prsent at about 25% to about 75%, by weight of the blend.

5. A blend as claimed in claim 2 wherein the impact modifier is present at about 5% to about 95%, by weight of the blend.

6. A blend as claimed in claim 2 wherein the impact modifier is present at about 25% to about 75%, by weight of the blend.

7. A blend as claimed in claim 1 wherein the average particle size of the impact modifier in the blend ranges from about 10 microns to about 100 microns.

8. A blend as claimed in claim 5 wherein the average particle size of the impact modifier in the blend ranges from about 10 microns to about 100 microns.

9. A blend as claimed in claim 6 wherein the average particle size of the impact modifier in the blend ranges from about 10 microns to about 100 microns.

10. A blend as claimed in claim 1 wherein the average particle size of the crosslinked acrylate, methacrylate, or compatible mixture thereof component is from about 0.3 to about 1.0 micron.

* * * * *

UNITED STATES PATENT AND TRADEMARK OFFICE
CERTIFICATE OF CORRECTION

PATENT NO. : 4,168,285
DATED : September 18, 1979
INVENTOR(S) : Michael J. Turczyk It is certified that error appears in the above-identified patent and that said Letters Patent are hereby corrected as shown below:

Col. 6, Table 1, first line under the heading "Izod Impact", the data "8.6/9.24" should read -- 8.16/9.24 --;

Col. 6, Footnote 3, line 3 under Table 1, "IG-120-MA" should read -- IG-1120-MA -- and "thw" should read -- the --; and Col. 8, Claim 4, line 2, "prsent" should read -- present --.

Signed and Sealed this

Sixteenth Day of September 1980

[SEAL]

Attest:

SIDNEY A. DIAMOND

Attesting Officer

Commissioner of Patents and Trademarks